United States Patent [19]

Yokoyama et al.

[11] Patent Number: 4,766,940
[45] Date of Patent: Aug. 30, 1988

[54] PNEUMATIC RADIAL TIRE HAVING AN EXCELLENT STEERING STABILITY

[75] Inventors: Hideki Yokoyama, Musashino; Tatsuro Shimada, Fussa; Masao Nakagawa, Higashimurayama, all of Japan

[73] Assignee: Bridgestone Tire Company Limited, Tokyo, Japan

[21] Appl. No.: 15,498

[22] Filed: Feb. 6, 1987

Related U.S. Application Data

[63] Continuation of Ser. No. 277,373, Jun. 25, 1981, abandoned.

[30] Foreign Application Priority Data

Jul. 8, 1980 [JP] Japan ................................ 55-92196

[51] Int. Cl.$^4$ ............................................ B60C 15/06
[52] U.S. Cl. .................................... 152/541; 152/543; 152/546; 152/547; 152/554
[58] Field of Search ............... 152/548, 552, 554, 555, 152/556, 560, 541, 546, 547, 543

[56] References Cited

U.S. PATENT DOCUMENTS

| | | | |
|---|---|---|---|
| 3,853,163 | 12/1974 | Mezzanotte et al. | 152/362 R |
| 3,904,463 | 9/1975 | Boileau | 152/362 R |
| 3,961,657 | 6/1976 | Chrobak | 152/355 |
| 3,964,533 | 6/1976 | Arimura et al. | 152/362 CS |
| 4,067,373 | 1/1978 | Delobelle et al. | 152/362 CS |
| 4,120,338 | 10/1978 | Mirtain | 152/354 R |
| 4,250,939 | 2/1981 | Shibata et al. | 152/362 R |
| 4,263,955 | 4/1981 | Ikeda | 152/362 R |
| 4,349,061 | 9/1982 | Hirakawa et al. | 152/362 R |

FOREIGN PATENT DOCUMENTS 53-4059 1/1978 Japan.

OTHER PUBLICATIONS

"Rubber Technology and Manufacture", Ed. Blow, CRC Press, 1970, p. 220, Table 6.16.
"Kevlar Aramid", Modern Textiles, Nov. 1976, pp. 26-30.

Primary Examiner—Michael Ball
Assistant Examiner—Ramon R. Hoch
Attorney, Agent, or Firm—Sughrue, Mion, Zinn, Macpeak & Seas

[57] ABSTRACT

A radial tire for passenger cars comprising a rubber filler interposed between a turn-up portion of a carcass ply wound around a bead ring from the inside toward the outside thereof and the carcass ply and having a dynamic modulus of elasticity of at least 300 kg/cm$^2$ and comprising an additional layer closely adhered to said rubber filler and composed of cords having a high modulus of elasticity which is larger than $2.5 \times 10^5$ kg/cm$^2$ and inclined at an angle within a range between 45° and 75° with respect to the carcass cord, the additional layer being arranged over a range which is 50% to 75% of the tire sectional height.

7 Claims, 3 Drawing Sheets

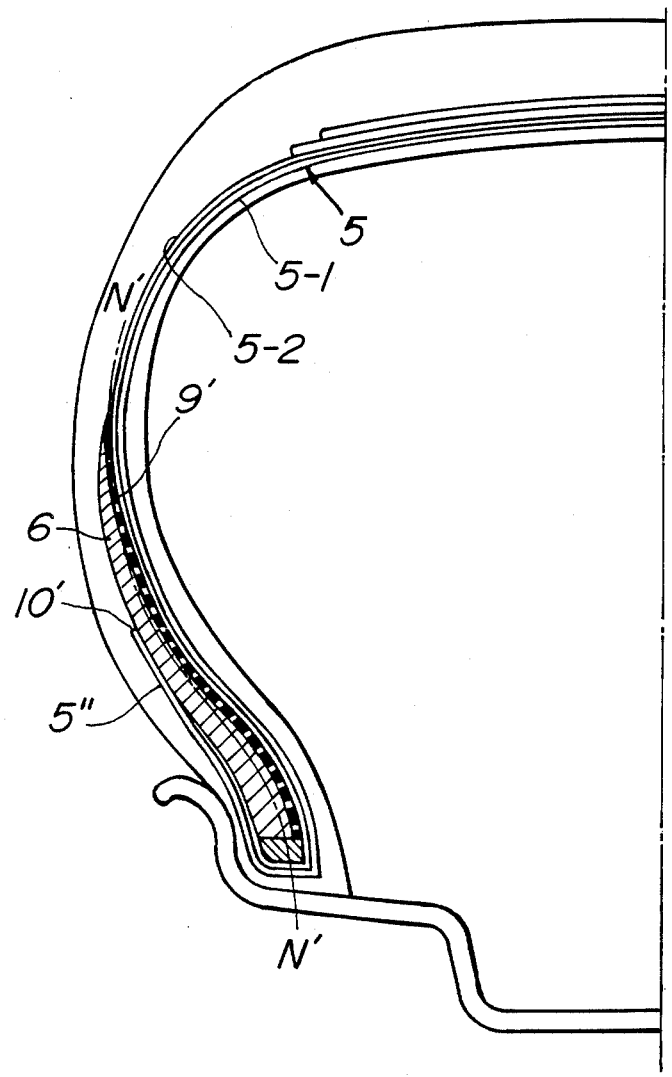

4,766,940

PNEUMATIC RADIAL TIRE HAVING AN EXCELLENT STEERING STABILITY

This is a continuation of Ser. No. 277,373, filed on June 25, 1981, now abandoned.

BACKGROUND OF THE INVENTION

1. Field of the Invention

This invention relates to pneumatic radial tires and more particularly to a pneumatic radical tire having an excellent steering stability and used for passenger cars, this invention increases the rigidity of that portion of the tire which extends from a bead portion to a side portion for the purpose of improving steering stability.

2. Description of the Prior Art

The radial tire has a basic construction comprising a carcass composed of one ply or small number of plies of a layer including cords arranged substantially in parallel with the radial direction of the tire and an inextensible belt layer located at the crown portion of the carcass having a width corresponding to the width of the tread. The radial tire having the above basic construction is suitable for heavy load vehicles such as truck, bus or the like which are used under an inflated condition with a high internal pressure. If such a radial tire is used for passenger cars which are under considerably low pressure when compared with the internal pressure of the radial tire for heavy load vehicles, the inherent property of the carcass that can easily be deformed by the exterior force acting upon various directions of the tire exhibits a comfortable riding feeling in the up and down directions. On the contary, the surplus deformation of the carcass in fore and aft directions and left and right directions tends to delay the steering response, thereby deteriorating the steering stability of the tire.

Many attempts have heretofore been made to eliminate the defects due to the above mentioned surplus deformation of the carcass while maintaining the good riding feeling. That is, various kinds of measures are taken along the lower region of the sidewall of the tire extending from the bead of the tire to the side portion for the purpose of improving the rigidity of the above-mentioned region, but none has led to a satisfactory result. That is, the reinforcement does not show any remarkable effect; a separation failure or the like is induced in or near the reinforcing portion. In a reinforcement construction described in U.S. Pat. No. 3,853,163, the reinforcement is effected by arranging one strip composed of metal cords inclined at an angle of 5° to 15° with respect to the circumferential direction of the tire and located at the lower region of the sidewall extending from the level of the bead wire located at the outside of the tire axial direction of a turn-up portion of the carcass to the upper limit which is 45% of the tire sectional height. Such a reinforcement construction has the advantage that the arrangement direction of the metal cords tends to improve the rigidity of the tire in the circumferential direction thereof without deteriorating the riding feeling property. But, such reinforcement construction has the disadvantage that the reinforcing efficiency is not sufficient even though the rigidity of the cord material is considerably higher than that of the carcass cord material and that of adjacent or peripheral member such as rubber or the like.

SUMMARY OF THE INVENTION

An object of the invention, therefore, is to provide a pneumatic radial tire in which a region from a bead to a side portion is effectively reinforced to considerably improve the steering stability of the tire.

A feature of the invention is the provision in a radial tire which is reinforced by a pair of annular bead rings and by a carcass composed of at least one radially arranged cord ply toroidally extending from the bead rings through the side portions to a crown portion. The bead portion is reinforced by a rubber filler interposed between a turn-up portion of the carcass ply wound around the bead ring from the inside toward the outside thereof and the carcass and extending from the upper portion of the bead ring to the side portion region. The crown portion is reinforced by an inextensible belt layer superimposed about the carcass. Specifically, the rubber filler has a dynamic modulus of elasticity of at least 300 kg/cm$^2$ and comprises an additional layer closely adhered to said rubber filler and composed of cords having a high modulus of elasticity larger than $2.5 \times 10^5$ kg/cm$^2$ and inclined at an angle within a range between 45° and 75° with respect to the carcass cord. The additional layer is arranged over a range which is 50% to 75% of the tire sectional height defined by the distances in radial direction from the bead portion base to the tread top point.

Further objects and features of the invention will be fully understood from the following detailed description with reference to the accompanying drawings, wherein:

BRIEF DESCRIPTION OF THE DRAWINGS

FIG. 4 is a cross-sectional view of left half of a second embodiment of a radial tire according to the invention.

DETAILED DESCRIPTION OF THE PREFERRED EMBODIMENTS

Figure 1:
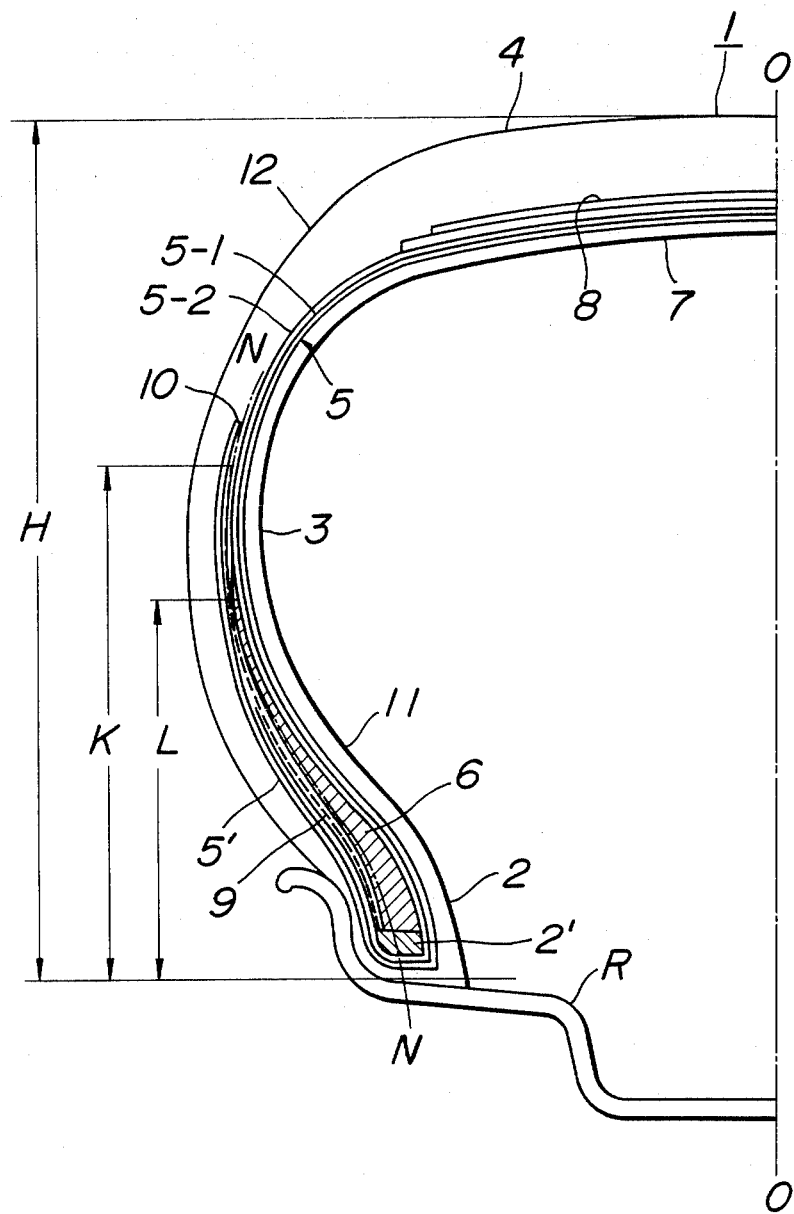
FIG. 1 is a cross-sectional view of left half of an embodiment of a radial tire according to the invention.

FIG. 1 shows left half of one embodiment of a radial tire according to the invention. But, it is a matter of course that the tire is symmetrical with respect to the equatorial plane 0—0 of the tire.

FIG. 1 shows a tire 1 mounted on a rim R and inflated by the normal internal pressure. The tire 1 is toroidally extended from a bead portion 2 located at the engaged position with the rim through a side portion 3 to a tread portion 4 in succession. These portions are reinforced by a carcass 5 in a usual manner. The carcass 5 is composed of one or a small number of plies of rubberized layer (two plies are shown in FIG. 1) including textile cords formed of nylon, polyester, rayon or the like and arranged substantially in parallel with the radial direction of the tire. The lower end of the carcass 5 is wound around a bead ring 2' from the inside toward the outside thereof to form a turn-up portion 5'. The space between the carcass 5 and the turn-up portion 5' is filled with a rubber filler 6 extending from the upper end of the bead ring 2' to a region of the side portion 3. In addition, a belt layer 8 is superimposed about the crown 7 of the carcass 5 over a full width of the tread 4 to reinforce the crown portion.

The rubber filler 6 may be formed of the following composition. That is, a vulcanizable rubber selected from the group of natural rubber, diene rubber, diene copolymer rubber or blend rubber including the above mentioned rubber with any desired ratio is compounded with 5 to 30, preferably 8 to 30, more preferably 15 to 25 parts by weight of thermo-setting resin with respect to 100 parts by weight of the above mentioned rubber and further compounded with 0.5 to 5 parts by weight of a hardening agent for thermo-setting resin, for example, hexamethylenetetramine. The rubber filler may suitably be compounded with a usual rubber compound other than the above mentioned compounding agent such as a reinforcing agent, filling agent, age resister, vulcanization accelerator, activating agent, softening agent, plasticizer, tackifier or the like so as to make its dynamic modulus of elasticity at least 300 kg/cm$^2$, preferably 600 to 1,500 kg/cm$^2$. The thermo-setting resin to be compounded is phenol resin, cresol resin or denatured resin denatured with phenol or cresol resin with any desired ratio, for example, cashew denatured phenol resin, cashew denatured cresol resin, cresol denatured phenol resin or oil denatured phenol or cresol resin denatured with an oil such as linolic acid, linolenic acid, oleic acid or the like, alkyl benzene denatured phenol denatured with alkyl benzene such as xylene, mesitylene or the like, phenol or cresol resin denatured with rubber such as cresol resin, nitrile rubber or the like.

In the present invention, because the carcass 5 and its turn-up portion 5' are interposed the rubber filler 6 having the above mentioned composition and an additional layer 9.

The additional layer 9 is composed of one rubberized layer including cords having a high modulus of elasticity of higher than 2.5×10$^5$ kg/cm$^2$ and inclined at an angle within a range between 45° and 75° with respect to the radially arranged carcass ply cords. The additional layer 9 closely adheres to the rubber filler 6. The cord angle of the additional layer 9 changes in dependence with its position in the radial direction. As a result, the cord angle of the additional layer 9 is represented by a value measured at a position located at an intermediate of a curved surface extending from the upper surface of the bead wire to the upper end of the additional layer. The cord to be used for the additional layer 9 and having the high modulus of elasticity may be formed of metallic cord represented by steel or organic textile cord such as aromatic polyamide textile available in market in the trade name of Kevlar. The additional layer 9 extends from the upper edge of the bead ring 2' along the rubber filler 6 whose thickness is gradually decreased in the region inclusive of the side portion 3. In the present embodiment, the additional layer extends along the rubber filler 6, whose thickness is gradually decreased from the upper edge of the bead ring 2' to the side portion region 3 and the upper end of additional layer 9, beyond the upper end of the rubber filler 6 in the tread direction. Let the tire sectional height defined by the distance between the bead base to the tread top point be H, the distance K from the bead base to the upper end of the additional layer 9 is within a range between 50 and 75% of the height H.

In the present invention, it is important that the neutral axis of the bending deformation produced at the side portion of the tire when the tire is subjected to the load or subjected to the centrifugal force produced in a direction which is horizontal to the tread surface when the tire runs along a curved or circular road should pass through a position shown by dot-and-dash lines N—N in FIG. 1. That is, the neutral axis of the bending deformation passing through the inside of the additional layer 9 is located at the center of the thin laminated cord layers at the upper region of the side portion where the rubber filler 6 is not interposed between the additional layer 9 and the carcass 5 or its turn-up portion 5'. But, the neutral axis of the bending deformation is gradually displaced from the additional layer toward the inside of the rubber filler 6 having the high dynamic modulus of elasticity according to the increase of the thickness of the rubber filler 6.

In the present invention, the rubber filler 6 closely adheres to the additional layer 9. In such construction, the sectional secondary moment under the bending deformation becomes increased by square of the amount of displacement of the neutral axis of the bending deformation. As a result, it is possible to obtain at the bend portion 2 a large sectional secondary moment which is considerably larger than that of the sectional secondary moment produced when the rubber filler 6 or the additional layer 9 is used singly, thereby improving the reinforcing efficiency. Even when the rubber filler 6 is closely adhered to the reinforcing layer 9, if the dynamic modulus of elasticity of the rubber filler 6 is smaller than 300 kg/cm$^2$ or the dynamic modulus of elasticity of the additional layer 9 is smaller than 2.5×10$^5$ kg/cm$^2$, the displacement of the neutral axis of the bending deformation toward the rubber filler could not be obtained.

Rubber has a compressive rigidity which is higher than 1.5 times the tensile rigidity. The rubber filler 6 is located at a position where compressive force is acted upon when the rubber filler is subjected to the bending deformation. In addition, the rubber filler 6 has a dynamic modulus of elasticity which is considerably higher than the usual value. Moreover, the cord of the additional layer 9 which closely adheres to the rubber filler 6 and is subjected to tension when the tire side portion is subjected to the bending deformation has a dynamic modulus of elasticity larger than 2.5×10$^5$ kg/cm$^2$. The use of a combination of such measures enables the neutral axis of the bending deformation to effect its required displacement toward the inside of the rubber filler. As seen from the above, the amount of displacement of the neutral axis of the bending deformation into the rubber filler 6 is largely dependent on the dynamic modulus of elasticity of the rubber filler 6. It is preferable therefore that the dynamic modulus of elasticity of the rubber filler 6 is within a range between 600 and 1,500 kg/cm$^2$ by taking the workability of the tire manufacture into consideration.

Whatever high modulus of elasticity is used for the cord of the additional layer 9, if the inclined cord angle is disregarded good expected effects could not be obtained and any other necessary properties of the tire become deteriorated. Experimental tests effected for the purpose of determining the range necessary for the angle of the cord of the additional layer 9 has demonstrated the following result.

Figure 2:
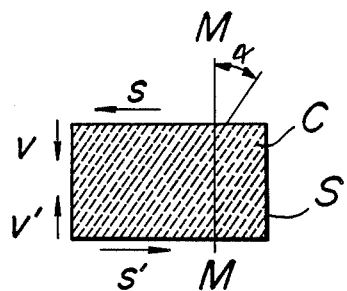
FIG. 2 is a plan view of a test piece of an additional layer used for the purpose of testing its rigidity.
Figure 3:
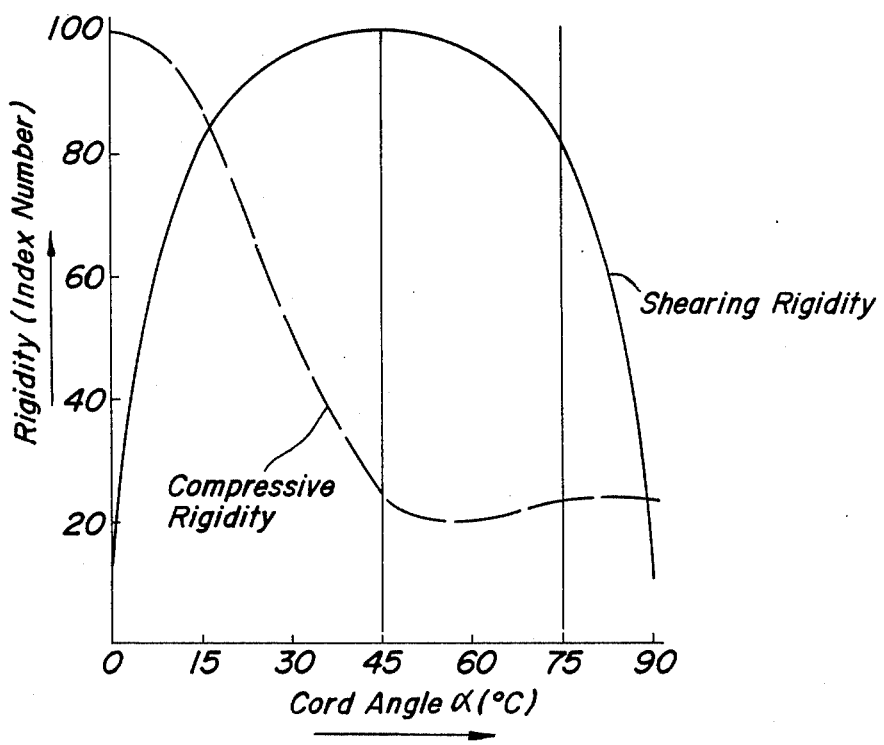
FIG. 3 is a graph illustrating the relation between rigidity of the test piece and cord angle thereof.

FIG. 2 shows a test sample manufactured in the manner similar to the additional layer 9 and FIG. 3 shows a graph illustrating the relation between the compressive rigidity and the shearing rigidity on the one hand and the cord angle $\alpha$ on the other hand obtained from the above mentioned test sample. The test sample S shown in FIG. 2 is composed of a square rubber having a given gauge and including steel cords C embedded therein.

The cords C are inclined at an angle α with respect to a line M—M corresponding to the cord direction, i.e., radial direction of the carcass. The test sample S is subjected to the shearing force in directions shown by arrows s, s' and compressive force in directions shown by arrows v, v'.

In FIG. 3, the abscissa shows the cord angle α and the ordinate shows the rigidity by index number. In FIG. 3, the shearing rigidity shown by a full line is of a convex parabolic shape which reaches a maximum value when the cord angle α is 45°. The compressive rigidity shown by broken lines is of a special curve which reaches a maximum value when the cord angle α is 0° and linearly lowered down from a position where the cord angle α is 10° to a position where the cord angle α is 45°. When these characteristic curves are applied to the tire, the use of the high shearing rigidity ensures an increase of the rigidity in the peripheral direction of the tire. This results in an improvement in the steering ability of the tire, and meanwhile the use of low compressive rigidity ensures a comfortable ride feeling of the tire.

As seen from FIG. 3, the range of the cord angle α where the compressive rigidity is low and the shearing rigidity is high lies within a range between 45° and 75°, preferably 55° and 72°.

Experimental tests have demonstrated that when the additional layer 9 constructed as above described is applied to the tire as shown in FIG. 1, whether or not the distance K of the upper end of the additional layer 9 from the bead base exceeds a position which is 50% of the tire sectional height H where the maximum width point of the tire is usually located exerts considerably large influence upon the steering stability of the tire with respect to the reinforcing effect. The experimental tests have also shown that the distance K of the upper end of the additional layer 9 from the bead base should be 50% to 75% and preferably 55% to 65% of the tire sectional height H.

It is preferable to make a ratio of the distance L of the upper end of the rubber filler 6 from the bead base to the tire sectional height H a range between 30% and 70%. In the embodiment shown in FIG. 1, the upper end portion of the additional layer 9 closely adheres to the carcass 3. Alternatively, between the upper end portion of the additional layer 9 and the carcass 3 is interposed a sheet shaped cushion rubber layer or the upper end of the rubber filler 6 may exceed the upper end of the additional layer 9.

The upper end 10 of the turn-up portion 5' may be located at a position which is lower than the upper end of the additional layer 9. But, in the embodiment shown in FIG. 1, the upper end 10 of the turn-up portion 5' exceeds the upper ends of respective rubber filler 6 and additional layer 9 to completely seal the rubber filler 6 and the additional layer 9 between the carcass 5 and its turn-up portion 5'. In the present embodiment, it is possible to improve considerably the rigidity of the region from the bead to the side portion of the tire and such improvement becomes more effective when the cord of the additional layer 9 is formed of steel. It is a matter of course that the upper end 10 of the turn-up portion 5' may be located at a position which is lower than the upper end of the additional layer 9 in dependence with the use of the tire.

In FIG. 1, reference numeral 11 designates an inner liner and 12 an outer rubber.

FIG. 4 shows left half of a second embodiment of a radial tire according to the invention. In this embodiment, the additional layer 9' closely adheres to that side of the rubber filler 6 which is adjacent to the carcass 5 and the upper end 10' of the turn-up portion 5'' is located at a position which is lower than the upper ends of respective rubber filler 6 and the additional layer 9. Such constructional features of the embodiment shown in FIG. 4 are different from those of the embodiment shown in FIG. 1. In the embodiment shown in FIG. 4, the lower portion of the neutral axis N'—N' of the bending deformation is also displaced toward the rubber filler 6. In the present embodiment, if the cord of the additional layer 9 is formed of steel, it is possible to displace the neutral axis N'—N' of the bending deformation by sufficiently large amount.

If the carcass ply 5 is composed of a plurality of plies $5_{-1}$, $5_{-2}$, and the outer ply $5_{-2}$ is extended outwardly in the axial direction with respect to the rubber filler 6 and additional layer 9 (FIG. 1), 9' (FIG. 4), the rubber filler 6 and additional layer 9, 9' may be interposed and sealed between the inner and outer plies $5_{-1}$, $5_{-2}$.

Experimental tests on steering stability and durability of a test tire having a size of 195/70H14 have demonstrated the following result. In the test tire, the carcass is composed of two rubberized plies including 1250 d/2 polyester cords radially arranged and the belt layer is composed of two rubberized plies including steel cords of $1 \times 5 \times 0.25$ superimposed one upon the other and crossed with each other at an angle of 73° with respect to the radial direction, i.e., the direction perpendicular to the equatorial plane of the tire. In the test tire, the rubber filler, additional layer 9, turn-up portion 5' and carcass ply 5 are arranged as shown in the embodiment shown in FIG. 1, and the cord of the additional layer 9 is composed of a rubberized steel cord layer which is equal to the rubberized steel cord layer used for the belt layer. The relation between the height of the rubber filler 6, additional layer 9, and the upper end of the turn-up portion relative to the sectional height H of the tire and also the cord angle of the additional layer 9 are listed in the following Table 1.

TABLE 1

| | |
|---|---|
| $\dfrac{\text{Height of rubber filler (L)}}{\text{Tire sectional height (H)}} \times 100$ | 45% |
| $\dfrac{\text{Height of additional layer (K)}}{\text{Tire sectional height (H)}} \times 100$ | 60% |
| $\dfrac{\text{Height of upper end of the turn-up portion}}{\text{Tire sectional height (H)}} \times 100$ | 65% |
| Cord angle of the additional layer | 65° |

An example of the composition of the rubber filler 6 and the physical property thereof are listed in the following Table 2.

TABLE 2

| | |
|---|---|
| Natural rubber | 100 parts by weight |
| Carbon black (HAF) | 75 parts by weight |
| Phenol resin | 24 parts by weight |
| Aromatic oil | 5 parts by weight |
| Sulfur | 6 parts by weight |
| Dynamic modulus of elasticity | 980 kg/cm$^2$ |

Note:
The dynamic modulus of elasticity listed in the above Table 2 was measured on a strip-shaped sample of 5 mm width × 2 mm thickness under the condition of number of oscillations of 50 Hz, dynamic strain of 1% and temperature of 25° C. with the aid of a testing machine composed of a viscoelastic spectrometer manufactured by Iwamoto Seisakusho Co., Ltd. in Japan.

The feeling test of the steering stability was effected on a test tire mounted on a rim having a size of 5½J and inflated under the internal pressure of 1.2 kg/cm² and mounted on four-wheeled passenger car and run around a asphalt-paved circular circuit.

The test was effected by changing lanes and running along a zigzag course under various speed conditions to be considered at a usual running. The experimental tests have demonstrated that the radial tire according to the invention has an excellent handling property, response and stability which have never been attained by the conventional tire, and hence obtained a good reputation.

The durability test of the tire was effected by a drum running test under a special high internal pressure and high load such that the reinforcing portion aimed at the present invention is subjected under a large burden. The durability test was effected under the testing conditions listed in the following Table 3.

TABLE 3

| | | |
|---|---|---|
| Internal pressure | 3.0 kg/cm² | Magnification 1.77 |
| Load | 970 kg | Magnification 2.0 |
| Drum diameter | 1.7 m | Made of steel and surface is flat |
| Speed | 60 km/h | Constant speed |
| Room temperature | 38° C. | Constant temperature |
| Running kilometer | 20,000 km | Continuous running |

After the tire has run over the above mentioned running kilometer, the tire is cut to investigate the reinforcing portion. No abnormal failures were found and sufficient durability of the tire was proved.

As stated hereinbefore, the radial tire for passenger cars according to the invention can effectively improve the steering stability without deteriorating any required riding ability and durability.

What is claimed is:

1. A radial tire comprising; a pair of annular bead rings, a carcass composed of at least one radially arranged textile cord ply toroidally extending from the bead rings through side portions to a crown portion, the bead portion being reinforced by a rubber filter interposed between a turn-up portion of the carcass ply wound around the bead ring from the inside toward the outside thereof and the carcass and extending from the upper portion of the bead ring to the side portion region, and the crown portion being reinforced by an inextensible belt layer superimposed about the carcass, said rubber filler having a dynamic modulus of elasticity of 600 to 1,500 kg/cm² and, a single additional layer interposed between the carcass and the rubber filler, said single additional layer consisting of steel cords inclined at an angle within a range between 45° and 75° with respect to the carcass cord, said single additional layer closely adhering to said rubber filler and arranged over a range which is 50% to 75% of the tire sectional height defined by the distance in the radial direction from the bead portion base to the tread top point, an upper end of said rubber filler extending toward said tread portion beyond an upper end of said additional layer and a neutral axis of bending deformation produced at an area disposed in said rubber filler in the bead portion when the tire is subjected to a load passes through said rubber filler along the side of said single additional layer.

2. The radial tire according to claim 1, wherein the upper end of the turn-up portion of the carcass ply exceeds the respective upper ends of the rubber filler and additional layer and extends toward the tread and the rubber filler and additional layer are completely sealed between the carcass and its turn-up portion.

3. The radial tire according to claim 1, wherein the upper end of the additional layer reaches a position which is 55% to 65% of the tire sectional height.

4. The radial tire according to claim 1, wherein the cords of the additional layer are inclined at an angle of 55° to 72° with respect to the carcass cords.

5. The radial tire according to claim 1, wherein said rubber filler comprises a vulcanizable rubber selected from the group consisting of natural rubber, diene rubber, diene copolymer rubber or blend rubber compounded with 5 to 30 parts by weight of thermosetting resin with respect to 100 parts by weight rubber and further compounded with 0.5 to 5 parts by weight of a hardening agent for thermo-setting resin.

6. The radial tire according to claim 5, wherein said thermo-setting resin is selected from the group consisting of phenol resin, cresol resin or denatured resin denatured with phenol or cresol resin such as cashew denatured phenol resin, cashew denatured cresol resin, cresol denatured phenol resin or oil denatured phenol or cresol resin denatured with an oil such as linolic acid, linolinic acid/or oleic acid, alkyl benzene denatured phenol denatured with alkyl benzene such as xylene or mesitylene, phenol or cresol resin denatured with rubber such as cresol resin or nitrile rubber.

7. The radial tire according to claim 5, wherein said rubber is further compounded with an agent to make the dynamic modulus of elasticity in the range of 600 to 1,500 kg/cm².

* * * * *